(12) United States Patent
Sardeshmukh et al.

(10) Patent No.: US 11,663,295 B2
(45) Date of Patent: May 30, 2023

(54) METHODS AND SYSTEMS FOR GENERATING SYNTHETIC MICROSTRUCTURE IMAGES OF MATERIAL WITH DESIRED FEATURES

(71) Applicant: Tata Consultancy Services Limited, Mumbai (IN)

(72) Inventors: Avadhut Mohanrao Sardeshmukh, Pune (IN); Sreedhar Sannareddy Reddy, Pune (IN); Purushottham Gautham Basavarsu, Pune (IN); Garima Jain, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 180 days.

(21) Appl. No.: 17/387,880

(22) Filed: Jul. 28, 2021

(65) Prior Publication Data

US 2022/0343116 A1 Oct. 27, 2022

(30) Foreign Application Priority Data

Mar. 22, 2021 (IN) .............................. 202121012275

(51) Int. Cl.
*G06V 10/774* (2022.01)
*G06F 18/21* (2023.01)
(Continued)

(52) U.S. Cl.
CPC .......... *G06F 18/217* (2023.01); *G06F 18/214* (2023.01); *G06F 18/22* (2023.01);
(Continued)

(58) Field of Classification Search
CPC ...... G06F 18/217; G06F 18/214; G06F 18/22; G06V 10/74; G06V 10/774; G06V 10/776;
(Continued)

(56) References Cited

U.S. PATENT DOCUMENTS 10,657,676 B1 5/2020 Rehfeld et al.
2019/0244513 A1* 8/2019 Niculescu-Mizil .......................... G06V 10/764

(Continued)

FOREIGN PATENT DOCUMENTS

CN 110276148 A 9/2019

OTHER PUBLICATIONS

Kim et al., "Exploration of Optimal Microstructure and Mechanical Properties in Continuous Microstructure Space Using a Variational Autoencoder", Feb. 2021 (Year: 2021).*

(Continued)

*Primary Examiner* — Aaron W Carter
(74) *Attorney, Agent, or Firm* — Finnegan, Henderson, Farabow, Garrett & Dunner, LLP

(57) ABSTRACT

The disclosure generally relates to methods and systems for generating synthetic microstructure images of a material with desired features. Conventional techniques that make use of unsupervised deep generative models has no control on the generated microstructure images with specific, desired set of features. The present disclosure generates the synthetic microstructure images of the material with desired feature, by using a variational autoencoder defined with a style loss function. In the first step, the variational autoencoder is trained to learn latent representation of microstructure image of the material. In the second step, some of the dimensions of learned latent representation is interpreted as physically significant features. In the third and last step, the latent representation required for getting the desired features is appropriately sampled based on the interpretation to generate the synthetic microstructure images of the material with desired features.

17 Claims, 10 Drawing Sheets

(51) Int. Cl.
  *G06F 18/22* (2023.01)
  *G06F 18/214* (2023.01)
  *G06V 10/74* (2022.01)
  *G06V 10/776* (2022.01)

(52) U.S. Cl.
  CPC ............ *G06V 10/74* (2022.01); *G06V 10/774* (2022.01); *G06V 10/776* (2022.01)

(58) Field of Classification Search
  CPC ......... G06T 7/0004; G06T 2207/10056; G06T 2207/20021; G06T 2207/20081; G06T 2207/20084
  See application file for complete search history.

(56) References Cited

U.S. PATENT DOCUMENTS

| | | | | |
|---|---|---|---|---|
| 2020/0349393 A1* | 11/2020 | Zhong | ................. | G06N 3/084 |
| 2021/0034836 A1* | 2/2021 | Haimovitch-Yogev | ..................... G06N 3/04 | |
| 2021/0049468 A1* | 2/2021 | Karras | ................. | G06T 5/003 |
| 2021/0150793 A1* | 5/2021 | Stratton | ................. | G06T 13/40 |
| 2022/0074994 A1* | 3/2022 | Senn | ................. | G06N 7/01 |
| 2022/0172496 A1* | 6/2022 | Wilkinson, Jr. | ...... | G06F 18/214 |
| 2022/0343116 A1* | 10/2022 | Sardeshmukh | ........ | G06V 10/74 |
| 2022/0351530 A1* | 11/2022 | Zaritsky | ............... | G06V 20/695 |
| 2022/0375024 A1* | 11/2022 | Luo | ........................ | G06T 3/0012 |

OTHER PUBLICATIONS

Sundar et al., "Database Development and Exploration of Process-Microstructure Relationships Using Variational Autoencoders", May 2020 (Year: 2020).*

Guo, Tinghao et al, "An Indirect Design Representation for Topology Optimization Using Variational Autoencoder and Style Transfer", AIAA/ASCE/AHS/ASC Structures, Structural, Jan. 2018, AIAA, http://systemdesign.illinois.edu/publications/Guo2018a.pdf.

Noraas, Ryan et al, "Structural Material Property Tailoring Using Deep Neural Networks", Machine Learning, Jan. 2019, Arxiv, https://arxiv.org/ftp/arxiv/papers/1901/1901.10281.pdf.

* cited by examiner

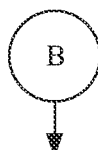

interpreting, via the one or more hardware processors, the trained variational autoencoder, with each cropped microstructure image of the plurality of cropped microstructure images of the material, to assign a plurality of predefined features for the corresponding cropped microstructure image 210 receiving, via the one or more hardware processors, (i) a test microstructure image of the material, whose synthetic microstructure images with the desired feature to be generated, and (ii) the desired feature, wherein the test microstructure image of the material is of a predefined test image size 212

generating, via the one or more hardware processors, the synthetic microstructure images with the desired feature, for the test microstructure image of the material, based on the desired feature, using the trained variational autoencoder 214

validating, via the one or more hardware processors, the trained variational autoencoder, using the plurality of validation cropped microstructure images 216

FIG. 2C interpreting the trained variational autoencoder, with each cropped microstructure image of the plurality of cropped microstructure images, to obtain the plurality of predefined features for the corresponding cropped microstructure image (210), further comprising:

determining the latent vector for each cropped microstructure image of the plurality of cropped microstructure images, using the encoder unit of the trained variational autoencoder, wherein the latent vector comprises the latent representation of the corresponding cropped microstructure image, with the predefined dimension 210a obtaining a plurality of variation latent vectors for each cropped microstructure image, wherein the plurality of variation latent vectors is obtained by varying each dimension of the corresponding latent vector in a predefined range 210b generating a reconstructed variation microstructure image for each variation latent vector to obtain a plurality of reconstructed variation microstructure images from the plurality of variation latent vectors, for each cropped microstructure image, using the decoder unit of the trained variational autoencoder 210c classifying each dimension associated with the latent vector for each cropped microstructure image, with a predefined feature of the plurality of predefined features, based on structural analysis of the corresponding reconstructed variation microstructure image 210d

FIG. 2D

Validating the trained variational autoencoder, using the plurality of validation cropped microstructure images (216), wherein the validation comprises:

generating a reconstructed validation microstructure image for each validation cropped microstructure image of the plurality of validation cropped microstructure images, using the trained variational autoencoder 216a determining a texture similarity score for each validation cropped microstructure image of the plurality of validation cropped microstructure images, wherein the texture similarity score for each validation cropped microstructure image defines a texture similarity between the reconstructed validation microstructure image and the corresponding validation cropped microstructure image 216b determining an average texture similarity score for the plurality of validation cropped microstructure images, based on the texture similarity score for each validation cropped microstructure image of the plurality of validation cropped microstructure images, to validate the trained variational autoencoder 216c

FIG. 2F

METHODS AND SYSTEMS FOR GENERATING SYNTHETIC MICROSTRUCTURE IMAGES OF MATERIAL WITH DESIRED FEATURES

PRIORITY CLAIM

This U.S. patent application claims priority under 35 U.S.C. § 119 to: Indian Patent Application No. 202121012275, filed on 22 Mar. 2021. The entire contents of the aforementioned application are incorporated herein by reference.

TECHNICAL FIELD

The disclosure herein generally relates to the field of material science, and, more particularly, to methods and systems for generating synthetic microstructure images of a material with desired features.

BACKGROUND

Internal structure of a material such as steel gets modified, when the material is put through a manufacturing process with defined process parameters, which in turn affects overall properties of the material. A lot of research have been done to investigate answers to questions such as (i) the manufacturing process required to achieve target properties of the material, (ii) the target properties and the structure of the material that change with the process parameters, and so on. Microscopic images associated with the microstructures of the material are typically used to determine complex mapping between (i) the manufacturing process with the defined process parameters and (ii) the target properties and the structure of the material, through the experimental characterization However, cost and difficulty of the experimental characterization is often prohibitively high. Hence, microstructure synthesis through a formal statistical characterization is considered to support computational design.

Traditionally, statistical descriptors have been used to synthetically reconstruct the microstructures. Conventional techniques that make use of unsupervised deep generative models such as generative adversarial nets (GANs) and variational autoencoders are used as an alternative to the traditional microstructure reconstruction methods. These unsupervised deep generative models try to learn compact latent representations from which the original inputs may be reconstructed most accurately. Further, the unsupervised deep generative models are capable of synthesizing microstructures that are more realistic and statistically equivalent to the training microstructures as compared to the traditional methods. However, in the conventional techniques, intuitive meanings of individual dimensions of the latent representations are not clear, hence there is no control on the generated microstructures with specific and desired set of features.

SUMMARY

Embodiments of the present disclosure present technological improvements as solutions to one or more of the above-mentioned technical problems recognized by the inventors in conventional systems.

In an aspect, there is provided a processor-implemented method for generating synthetic microstructure images of a material with desired feature, the method comprising the steps of: receiving a plurality of microstructure images of the material, wherein each microstructure image of the plurality of microstructure images is of a predefined image size; dividing each microstructure image of the plurality of microstructure images of the material, into one or more cropped microstructure images, based on the predefined image size of the corresponding microstructure image, to obtain a plurality of cropped microstructure images from the plurality of microstructure images of the material, wherein each cropped microstructure image of the plurality of cropped microstructure images is of a predefined cropped image size; splitting the plurality of cropped microstructure images of the material, into a plurality of train cropped microstructure images and a plurality of validation cropped microstructure images, based on a predefined ratio; generating a trained variational autoencoder, by training a variational autoencoder with the plurality of train cropped microstructure images, wherein the trained variational autoencoder is generated by: forming a mini batch using one or more train cropped microstructure images out of the plurality of train cropped microstructure images, based on a predefined mini batch size, to obtain one or more mini batches from the plurality of train cropped microstructure images; passing the one or more train cropped microstructure images present in each mini batch, at a time, out of the one or more mini batches, to the variational autoencoder for the training; and performing, for the one or more train cropped microstructure images present in each mini batch, at a time, until the one or more mini batches are completed, to generate the trained variational autoencoder, the steps of: determining a latent vector of each train cropped microstructure image of the one or more train cropped microstructure images present in the mini batch, using an encoder unit of the variational autoencoder, wherein the latent vector comprises a latent representation of the corresponding train cropped microstructure image, with a predefined dimension; passing the latent vector of each train cropped microstructure image of the one or more train cropped microstructure images present in the mini batch, to a decoder unit of the variational autoencoder, to get a reconstructed cropped microstructure image of the corresponding train cropped microstructure image; estimating a set of model weights of the variational autoencoder, by minimizing a loss function of the variational autoencoder; and updating the variational autoencoder with the set of model weights; interpreting the trained variational autoencoder, with each cropped microstructure image of the plurality of cropped microstructure images of the material, to assign a plurality of predefined features for the corresponding cropped microstructure image; receiving (i) a test microstructure image of the material, whose synthetic microstructure images with the desired feature to be generated, and (ii) the desired feature, wherein the test microstructure image of the material is of a predefined test image size; and generating the synthetic microstructure images with the desired feature, for the test microstructure image of the material, based on the desired feature, using the trained variational autoencoder.

In another aspect, there is provided a system for generating synthetic microstructure images of a material with desired feature, the system comprising: a memory storing instructions; one or more Input/Output (I/O) interfaces; and one or more hardware processors coupled to the memory via the one or more I/O interfaces, wherein the one or more hardware processors are configured by the instructions to: receive a plurality of microstructure images of the material, wherein each microstructure image of the plurality of microstructure images is of a predefined image size; divide each microstructure image of the plurality of microstructure images of the material, into one or more cropped microstructure images, based on the predefined image size of the corresponding microstructure image, to obtain a plurality of cropped microstructure images from the plurality of microstructure images of the material, wherein each cropped microstructure image of the plurality of cropped microstructure images is of a predefined cropped image size; split the plurality of cropped microstructure images of the material, into a plurality of train cropped microstructure images and a plurality of validation cropped microstructure images, based on a predefined ratio; generate a trained variational autoencoder, by training a variational autoencoder with the plurality of train cropped microstructure images, wherein the trained variational autoencoder is generated by: forming a mini batch using one or more train cropped microstructure images out of the plurality of train cropped microstructure images, based on a predefined mini batch size, to obtain one or more mini batches from the plurality of train cropped microstructure images; passing the one or more train cropped microstructure images present in each mini batch, at a time, out of the one or more mini batches, to the variational autoencoder for the training; and performing, for the one or more train cropped microstructure images present in each mini batch, at a time, until the one or more mini batches are completed, to generate the trained variational autoencoder, the steps of: determining a latent vector of each train cropped microstructure image of the one or more train cropped microstructure images present in the mini batch, using an encoder unit of the variational autoencoder, wherein the latent vector comprises a latent representation of the corresponding train cropped microstructure image, with a predefined dimension; passing the latent vector of each train cropped microstructure image of the one or more train cropped microstructure images present in the mini batch, to a decoder unit of the variational autoencoder, to get a reconstructed cropped microstructure image of the corresponding train cropped microstructure image; estimating a set of model weights of the variational autoencoder, by minimizing a loss function of the variational autoencoder; and updating the variational autoencoder with the set of model weights; interpret the trained variational autoencoder, with each cropped microstructure image of the plurality of cropped microstructure images of the material, to assign a plurality of predefined features for the corresponding cropped microstructure image; receive (i) a test microstructure image of the material, whose synthetic microstructure images with the desired feature to be generated, and (ii) the desired feature, wherein the test microstructure image of the material is of a predefined test image size; and generate the synthetic microstructure images with the desired feature, for the test microstructure image of the material, based on the desired feature, using the trained variational autoencoder.

In yet another aspect, there is provided a computer program product comprising a non-transitory computer readable medium having a computer readable program embodied therein, wherein the computer readable program, when executed on a computing device, causes the computing device to: receive a plurality of microstructure images of the material, wherein each microstructure image of the plurality of microstructure images is of a predefined image size; divide each microstructure image of the plurality of microstructure images of the material, into one or more cropped microstructure images, based on the predefined image size of the corresponding microstructure image, to obtain a plurality of cropped microstructure images from the plurality of microstructure images of the material, wherein each cropped microstructure image of the plurality of cropped microstructure images is of a predefined cropped image size; split the plurality of cropped microstructure images of the material, into a plurality of train cropped microstructure images and a plurality of validation cropped microstructure images, based on a predefined ratio; generate a trained variational autoencoder, by training a variational autoencoder with the plurality of train cropped microstructure images, wherein the trained variational autoencoder is generated by: forming a mini batch using one or more train cropped microstructure images out of the plurality of train cropped microstructure images, based on a predefined mini batch size, to obtain one or more mini batches from the plurality of train cropped microstructure images; passing the one or more train cropped microstructure images present in each mini batch, at a time, out of the one or more mini batches, to the variational autoencoder for the training; and performing, for the one or more train cropped microstructure images present in each mini batch, at a time, until the one or more mini batches are completed, to generate the trained variational autoencoder, the steps of: determining a latent vector of each train cropped microstructure image of the one or more train cropped microstructure images present in the mini batch, using an encoder unit of the variational autoencoder, wherein the latent vector comprises a latent representation of the corresponding train cropped microstructure image, with a predefined dimension; passing the latent vector of each train cropped microstructure image of the one or more train cropped microstructure images present in the mini batch, to a decoder unit of the variational autoencoder, to get a reconstructed cropped microstructure image of the corresponding train cropped microstructure image; estimating a set of model weights of the variational autoencoder, by minimizing a loss function of the variational autoencoder; and updating the variational autoencoder with the set of model weights; interpret the trained variational autoencoder, with each cropped microstructure image of the plurality of cropped microstructure images of the material, to assign a plurality of predefined features for the corresponding cropped microstructure image; receive (i) a test microstructure image of the material, whose synthetic microstructure images with the desired feature to be generated, and (ii) the desired feature, wherein the test microstructure image of the material is of a predefined test image size; and generate the synthetic microstructure images with the desired feature, for the test microstructure image of the material, based on the desired feature, using the trained variational autoencoder.

In an embodiment, validating the trained variational autoencoder, using the plurality of validation cropped microstructure images comprises: generating a reconstructed validation microstructure image for each validation cropped microstructure image of the plurality of validation cropped microstructure images, using the trained variational autoencoder; determining a texture similarity score for each validation cropped microstructure image of the plurality of validation cropped microstructure images, wherein the texture similarity score for each validation cropped microstructure image defines a texture similarity between the reconstructed validation microstructure image and the corresponding validation cropped microstructure image; and determining an average texture similarity score for the plurality of validation cropped microstructure images, based on the texture similarity score for each validation cropped microstructure image of the plurality of validation cropped microstructure images, to validate the trained variational autoencoder.

In an embodiment, interpreting the trained variational autoencoder, with each cropped microstructure image of the plurality of cropped microstructure images, to assign the plurality of predefined features for the corresponding cropped microstructure image, further comprising: determining the latent vector for each cropped microstructure image of the plurality of cropped microstructure images, using the encoder unit of the trained variational autoencoder, wherein the latent vector comprises the latent representation of the corresponding cropped microstructure image, with the predefined dimension; obtaining a plurality of variation latent vectors for each cropped microstructure image, wherein the plurality of variation latent vectors is obtained by varying each dimension of the corresponding latent vector in a predefined range; generating a reconstructed variation microstructure image for each variation latent vector to obtain a plurality of reconstructed variation microstructure images from the plurality of variation latent vectors, for each cropped microstructure image, using the decoder unit of the trained variational autoencoder; and assigning each dimension associated with the latent vector for each cropped microstructure image, with a predefined feature of the plurality of predefined features, based on structural analysis of the corresponding reconstructed variation microstructure image.

In an embodiment, generating the synthetic microstructure images with the desired feature, for the test microstructure image of the material, based on the desired feature, using the trained variational autoencoder, further comprising: resizing the test microstructure image of the material, based on the predefined test image size, to obtain a resized test microstructure image of the material, wherein the resized test microstructure image of the material is of a predefined transformed image size; determining a test latent vector of the resized test microstructure image of the material, using the encoder unit of the trained variational autoencoder, wherein the test latent vector of the resized test microstructure image of the material comprises the latent representation of the resized test microstructure image, with the predefined dimension; identifying a dimension for the resized test microstructure image of the material, based on the desired feature, from classification performed during the interpretation of the trained variational autoencoder; obtaining a variation test latent vector of the resized test microstructure image of the material, by varying the identified dimension in the test latent vector of the resized test microstructure image of the material, in a predefined range; and generating the synthetic microstructure images with the desired feature, by passing the variation test latent vector of the resized test microstructure image of the material, through the decoder unit of the trained variational autoencoder.

In an embodiment, the loss function of the variational autoencoder comprises a style loss function and a Kullback-Leibler (KL) loss function, wherein the style loss function determines a style loss between each train cropped microstructure image present in each mini batch of the one or more mini batches and the corresponding reconstructed cropped microstructure image, and (ii) the KL loss function determines a KL divergence between posterior distribution of the latent vector of each train cropped microstructure image present in each mini batch of the one or more mini batches and a predefined prior distribution.

In an embodiment, the encoder unit of the variational autoencoder comprises five convolutional neural network (CNN) blocks, four max-pooling layers, and two parallel fully connected network (FCN) layers, wherein each CNN block is followed by a max-pooling layer except the last CNN block.

In an embodiment, the decoder unit of the variational autoencoder comprises a fully connected layer, four deconvolution layers, and four up-sampling layers, wherein each deconvolution layer is preceded by an up-sampling layer.

In an embodiment, the plurality of predefined features defines morphological features of the material.

It is to be understood that both the foregoing general description and the following detailed description are exemplary and explanatory only and are not restrictive of the embodiments of the present disclosure, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 2A through FIG. 2F illustrate exemplary flow diagrams of a processor-implemented method for generating synthetic microstructure images of the material with the desired feature, in accordance with some embodiments of the present disclosure.

DETAILED DESCRIPTION OF EMBODIMENTS

Figure 1:
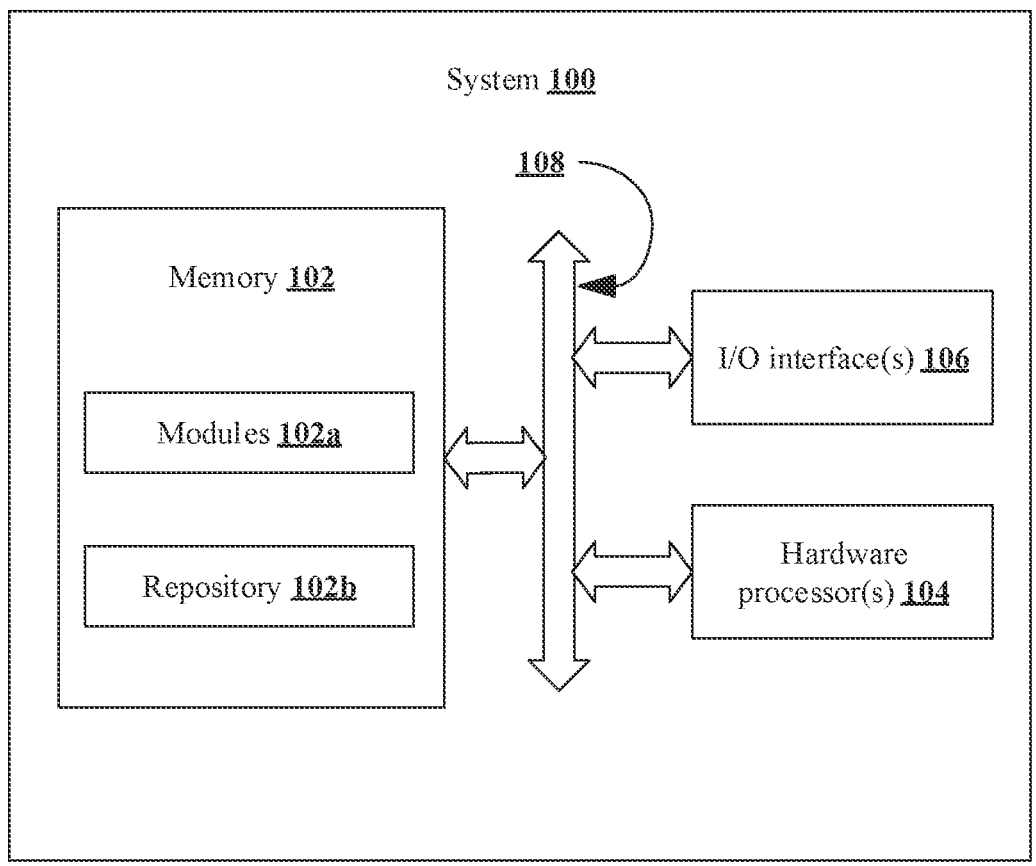
FIG. 1 is an exemplary block diagram of a system for generating synthetic microstructure images of a material with a desired feature, in accordance with some embodiments of the present disclosure.
Figure 2A:
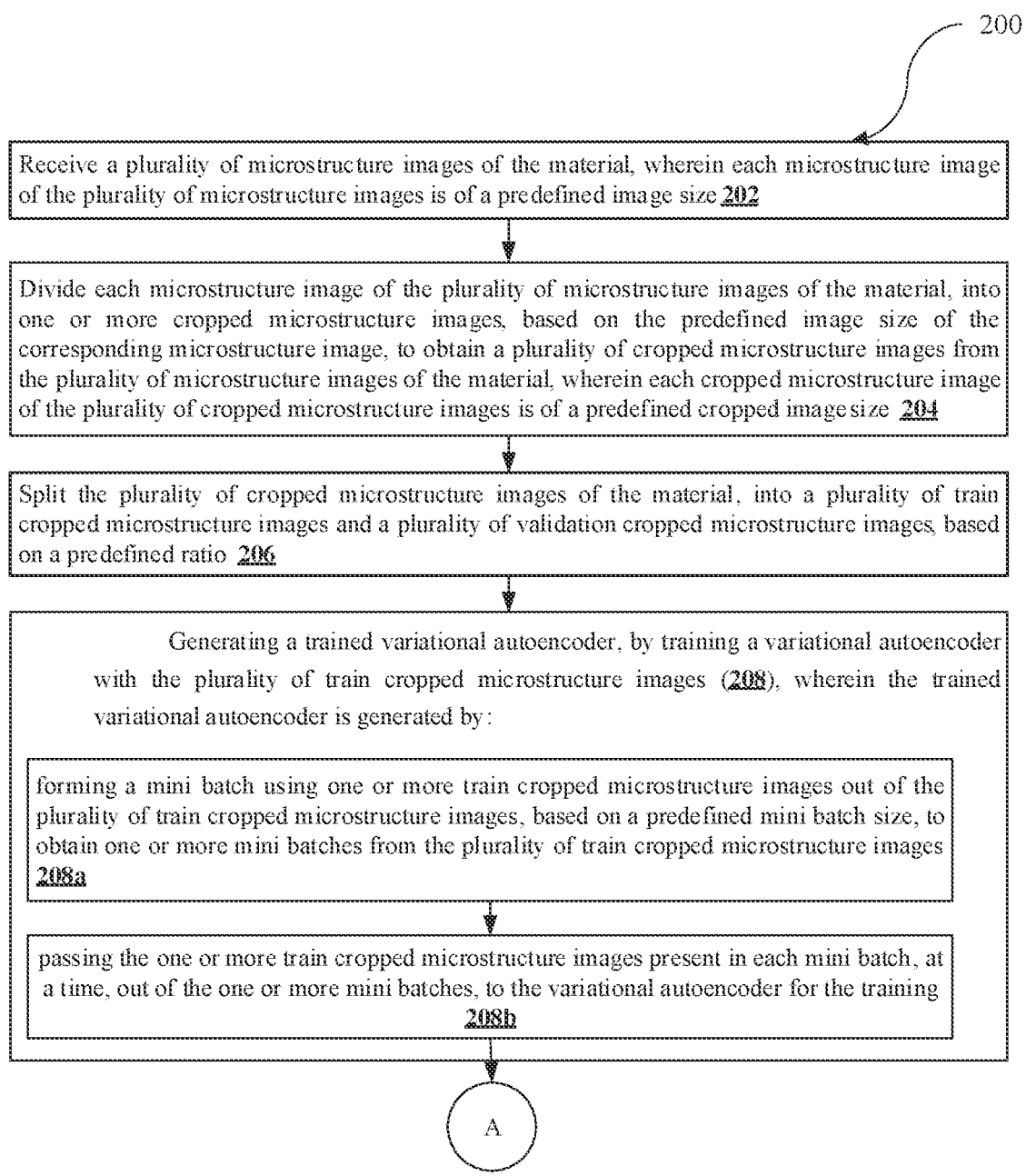
Figure 2B:
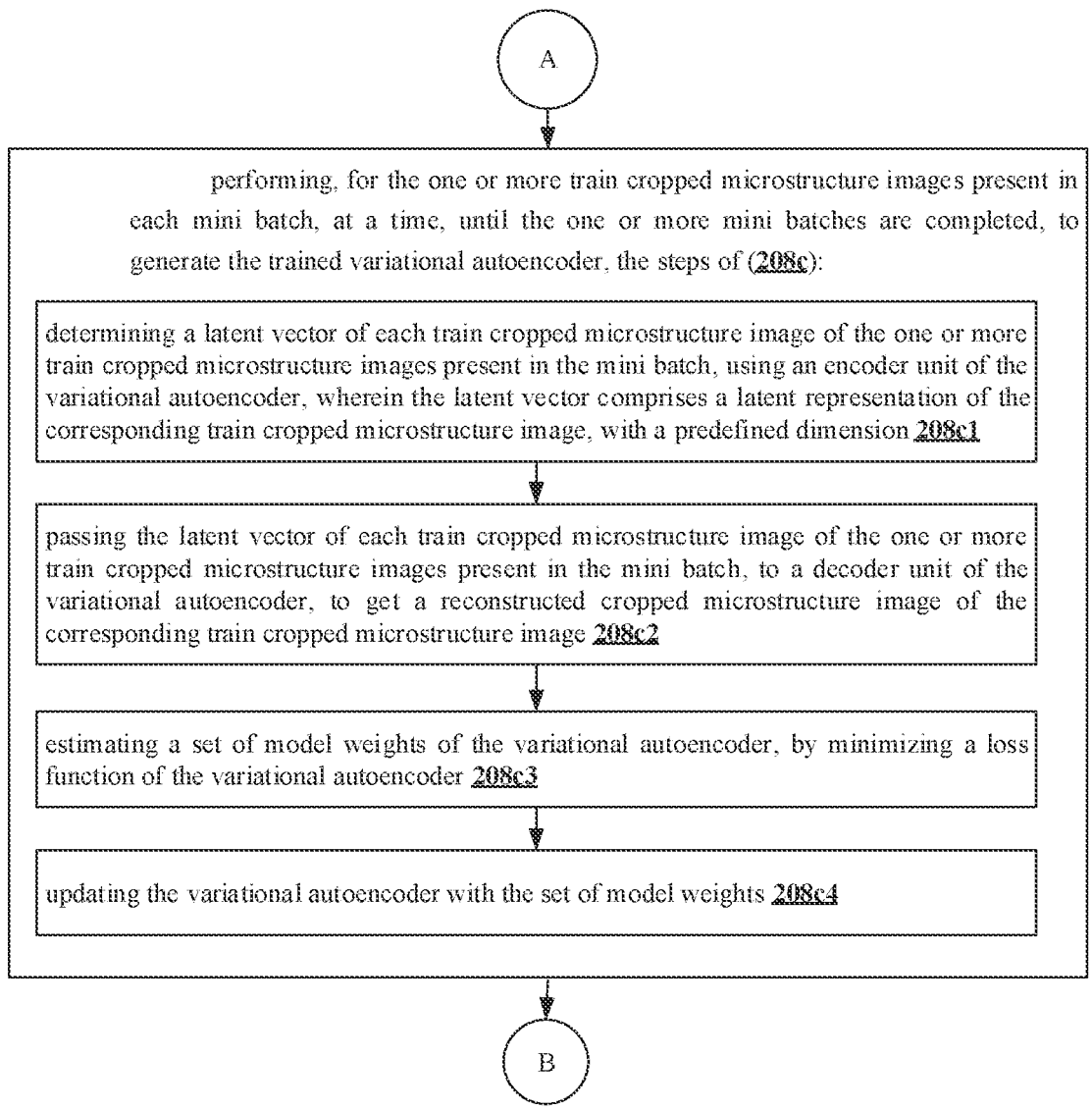
Figure 2E:
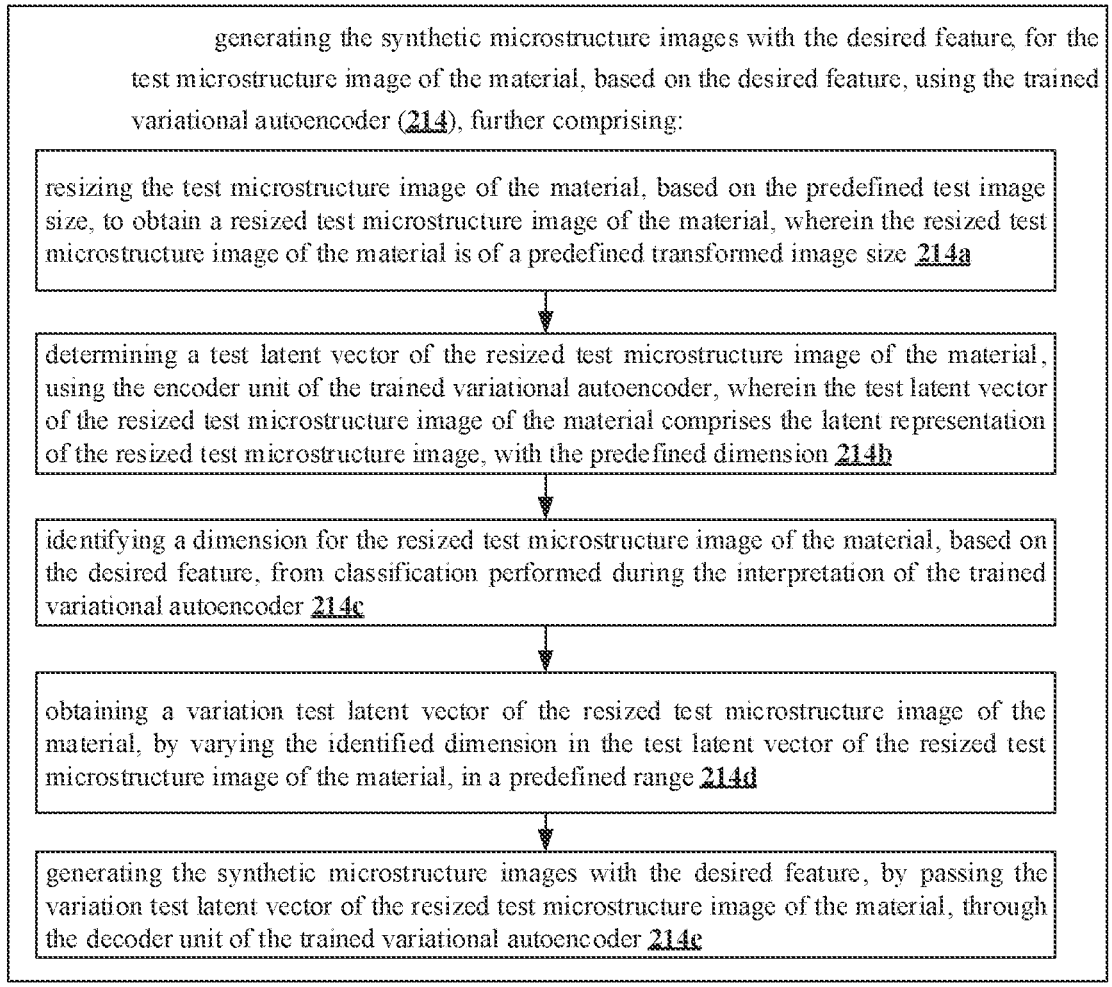

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The present disclosure herein provides methods and systems that solves the technical problem of generating synthetic microstructure images of a material with desired feature, by using a variational autoencoder defined with a loss function. In the first step, the variational autoencoder is trained to learn latent representation of microstructure image of the material. In the second step, some of the dimensions of learned latent representation is interpreted as physically significant features. In the third and last step, the latent representation required for getting the desired features is appropriately sampled based on the interpretation to generate the synthetic microstructure images of the material with desired features.

In the context of the present disclosure, the terms 'microstructure' and 'microstructure image' may be interchangeably used, however, they refer to the microscopic images of the given material.

Referring now to the drawings, and more particularly to FIG. 1 through FIG. 6, where similar reference characters denote corresponding features consistently throughout the figures, there are shown preferred embodiments and these embodiments are described in the context of the following exemplary systems and/or methods.

FIG. 1 is an exemplary block diagram of a system 100 for generating synthetic microstructure images of a material with a desired feature, in accordance with some embodiments of the present disclosure. In an embodiment, the system 100 includes or is otherwise in communication with one or more hardware processors 104, communication interface device(s) or input/output (I/O) interface(s) 106, and one or more data storage devices or memory 102 operatively coupled to the one or more hardware processors 104. The one or more hardware processors 104, the memory 102, and the I/O interface(s) 106 may be coupled to a system bus 108 or a similar mechanism.

The I/O interface(s) 106 may include a variety of software and hardware interfaces, for example, a web interface, a graphical user interface, and the like. The I/O interface(s) 106 may include a variety of software and hardware interfaces, for example, interfaces for peripheral device(s), such as a keyboard, a mouse, an external memory, a plurality of sensor devices, a printer and the like. Further, the I/O interface(s) 106 may enable the system 100 to communicate with other devices, such as web servers and external databases.

The I/O interface(s) 106 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface(s) 106 may include one or more ports for connecting a number of computing systems with one another or to another server computer. Further, the I/O interface(s) 106 may include one or more ports for connecting a number of devices to one another or to another server.

The one or more hardware processors 104 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In the context of the present disclosure, the expressions 'processors' and 'hardware processors' may be used interchangeably. In an embodiment, the system 100 can be implemented in a variety of computing systems, such as laptop computers, portable computer, notebooks, hand-held devices, workstations, mainframe computers, servers, a network cloud and the like.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a plurality of modules 102A and a repository 102B for storing data processed, received, and generated by one or more of the plurality of modules 102A.

The plurality of modules 102A may include routines, programs, objects, components, data structures, and so on, which perform particular tasks or implement particular abstract data types.

The plurality of modules 102A may include programs or computer-readable instructions or coded instructions that supplement applications or functions performed by the system 100. The plurality of modules 102A may also be used as, signal processor(s), state machine(s), logic circuitries, and/or any other device or component that manipulates signals based on operational instructions. Further, the plurality of modules 102A can be used by hardware, by computer-readable instructions executed by the one or more hardware processors 104, or by a combination thereof. In an embodiment, the plurality of modules 102A can include various sub-modules (not shown in FIG. 1). Further, the memory 102 may include information pertaining to input(s)/output(s) of each step performed by the processor(s) 104 of the system 100 and methods of the present disclosure.

The repository 102B may include a database or a data engine. Further, the repository 102B amongst other things, may serve as a database or includes a plurality of databases for storing the data that is processed, received, or generated as a result of the execution of the plurality of modules 102A. Although the repository 102B is shown internal to the system 100, it will be noted that, in alternate embodiments, the repository 102B can also be implemented external to the system 100, where the repository 102B may be stored within an external database (not shown in FIG. 1) communicatively coupled to the system 100. The data contained within such external database may be periodically updated. For example, new data may be added into the external database and/or existing data may be modified and/or non-useful data may be deleted from the external database. In one example, the data may be stored in an external system, such as a Lightweight Directory Access Protocol (LDAP) directory and a Relational Database Management System (RDBMS). In another embodiment, the data stored in the repository 102B may be distributed between the system 100 and the external database.

Referring to FIG. 2A through FIG. 2F, components and functionalities of the system 100 are described in accordance with an example embodiment of the present disclosure. For example, FIG. 2A through FIG. 2F illustrate exemplary flow diagrams of a processor-implemented method 200 for generating synthetic microstructure images of the material with the desired feature, in accordance with some embodiments of the present disclosure. Although steps of the method 200 including process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any practical order. Further, some steps may be performed simultaneously, or some steps may be performed alone or independently.

At step 202 of the method 200, the one or more hardware processors 104 of the system 100 are configured to receive a plurality of microstructure images of the material. The material may be a process material such as iron, whose synthetic microstructure images with the desired features are required. Each microstructure image of the plurality of microstructure images is of a predefined image size. The predefined image size represents an image resolution (number of pixels) of the microstructure image. In an embodiment, the predefined image size of each microstructure image of the plurality of microstructure images may be same. In another embodiment, the predefined image size of each microstructure image of the plurality of microstructure images may be different. Further some microstructure images of the plurality of microstructure images may be of same predefined image size, while the other microstructure images may be of different predefined image size.

At step 204 of the method 200, the one or more hardware processors 104 of the system 100 are configured to divide each microstructure image of the plurality of microstructure images of the material received at step 202 of the method 200, into one or more cropped microstructure images, based on the predefined image size of the corresponding microstructure image, such that each cropped microstructure images of the one or more cropped microstructure images is of a predefined cropped image size. The one or more cropped microstructure images from each microstructure image are obtained by sliding a window with a predefined stride. The predefined stride is defined and large enough to get reasonably different patterns in each cropped microstructure image. For example, the predefined stride may be 50.

The predefined cropped image size represents the image resolution (number of pixels) of the cropped microstructure image. The predefined cropped image size may be less than or equal to the least predefined image size of the microstructure image, out of the plurality of microstructure images of the material received at step 202 of the method 200. A plurality of cropped microstructure images is obtained from the plurality of microstructure images of the material. The predefined cropped image size of each cropped microstructure image of the plurality of cropped microstructure images is same. For example, the predefined cropped image size of each cropped microstructure image may be 128×128.

At step 206 of the method 200, the one or more hardware processors 104 of the system 100 are configured to split the plurality of cropped microstructure images of the material obtained at step 204 of the method, into a plurality of train cropped microstructure images and a plurality of validation cropped microstructure images, based on a predefined ratio. The predefined ratio defines a number of cropped microstructure images out the plurality of cropped microstructure images to be the plurality of train cropped microstructure images and the plurality of validation cropped microstructure images. In an embodiment, the predefined ratio may be 80%:20%.

Figure 3:
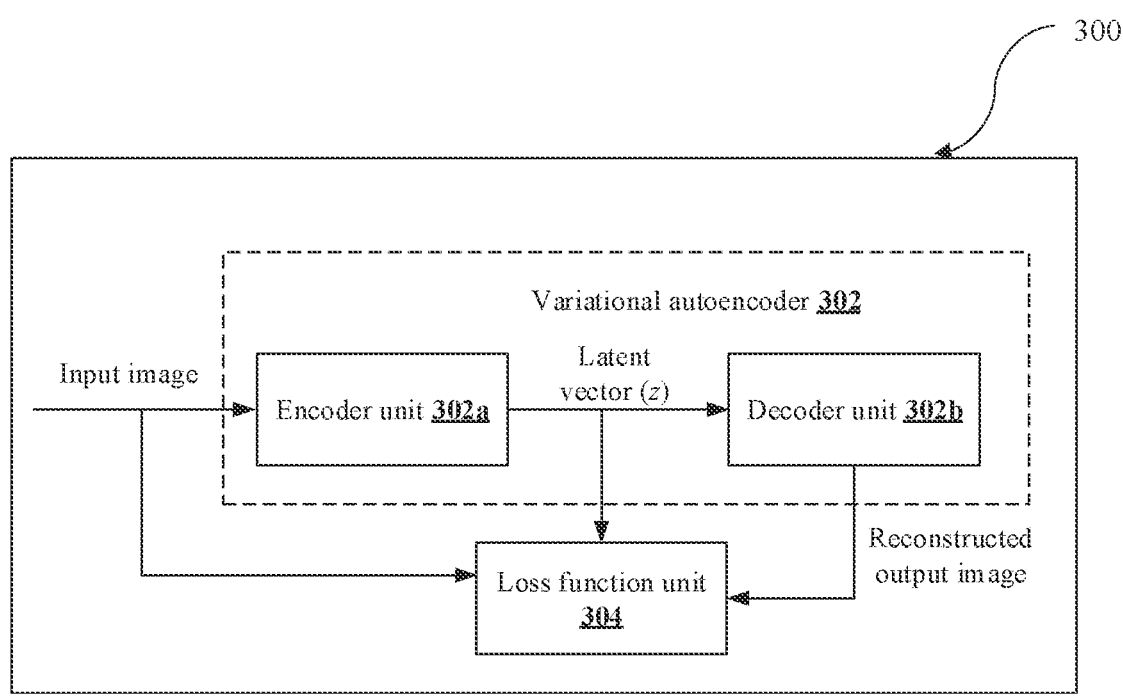
FIG. 3 is an exemplary block diagram of a variational autoencoder along with a loss function unit, for generating synthetic microstructure images of the material with the desired feature, in accordance with some embodiments of the present disclosure.

At step 208 of the method 200, the one or more hardware processors 104 of the system 100 are configured to generate a trained variational autoencoder, by training the variational autoencoder with the plurality of train cropped microstructure images obtained at step 206 of the method 200. FIG. 3 is an exemplary block diagram 300 of the variational autoencoder 302 along with a loss function unit 304, for generating synthetic microstructure images of the material with the desired feature, in accordance with some embodiments of the present disclosure.

As shown in FIG. 3, the variational autoencoder 302 includes an encoder unit 302a and a decoder unit 302b. The loss function unit 304 includes a loss function network 304a (not shown in FIG. 2). The encoder unit 302a of the variational autoencoder 300 takes an input microstructure image and generates a latent vector of the input image. The decoder unit 302b of the variational autoencoder 300 takes the latent vector of the input microstructure image and tries to generate a reconstructed microstructure output image for the input microstructure image, such that a loss calculated by the loss function unit 304, based on a loss function of the variational autoencoder 302, defined between the input microstructure image and the reconstructed microstructure output image, is minimum.

Figure 4:
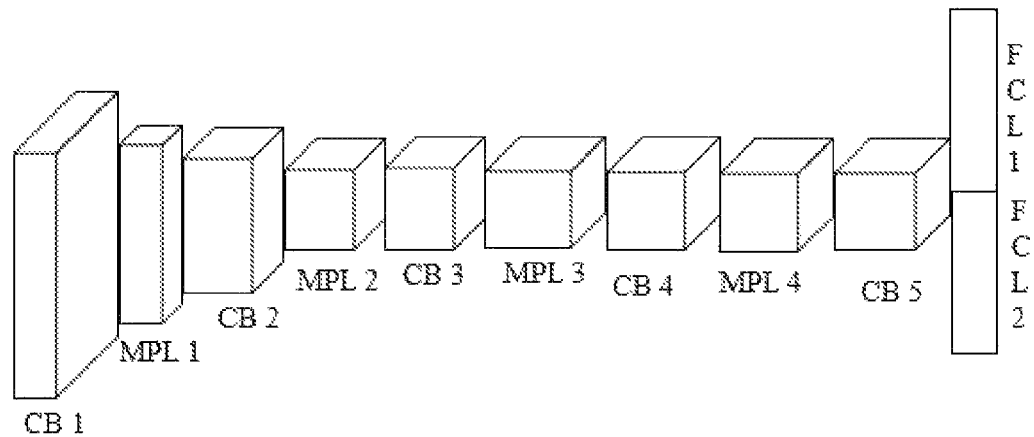
FIG. 4 shows an architecture of an encoder unit of a variational autoencoder, in accordance with some embodiments of the present disclosure.

The encoder unit 302a of the variational autoencoder 300 includes five convolutional neural network (CNN) blocks, four max-pooling layers, and two parallel fully connected network (FCN) layers, wherein each CNN block is followed by a max-pooling layer except the last CNN block. FIG. 4 shows an architecture of the encoder unit 302a of the variational autoencoder 302, in accordance with some embodiments of the present disclosure. As shown in FIG. 4, the encoder unit 302a includes a first CNN block (CB 1), a first max-pooling layer (MPL 1), a second CNN block (CB 2), a second max-pooling layer (MPL 2), a third CNN block (CB 3), a third max-pooling layer (MPL 3), a fourth CNN block (CB 4), a fourth max-pooling layer (MPL 4), a fifth CNN block (CB 1), a first fully connected layer (FCL 1), and a second fully connected layer (FCL 2). The first CNN block (CB 1) includes two convolution layers each with 64 filters of a filter size 3×3. The second CNN block (CB 2) includes two convolution layers each with 128 filters of the filter size 3×3. The third CNN block (CB 3) includes four convolution layers each with 256 filters of the filter size 3×3. The fourth CNN block (CB 4) includes four convolution layers each with 512 filters of the filter size 3×3. The fifth CNN block (CB 5) includes four convolution layers each with 512 filters of the filter size 3×3. In an embodiment, the encoder unit 302a may be obtained by removing top two fully connected layers of VGG-19 convolutional neural network (CNN) and by adding the first fully connected layer (FCL 1), and the second fully connected layer (FCL 2) in parallel, on top of the VGG-19 CNN. The first fully connected layer (FCL 1), and the second fully connected layer (FCL 2) are defined with a mean vector and a variance vector to learn the latent representation of the input image.

Figure 5:
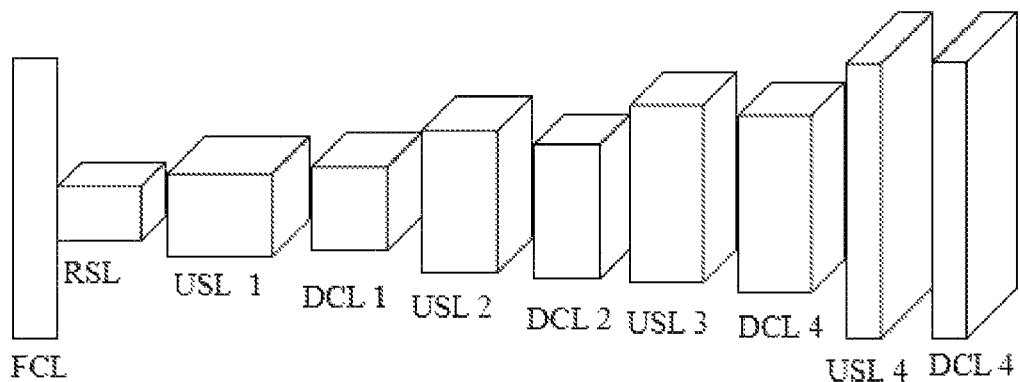
FIG. 5 shows an architecture of a decoder unit of the variational autoencoder, in accordance with some embodiments of the present disclosure.

The decoder unit 302b of the variational autoencoder 300 includes a fully connected layer, four deconvolution layers, and four up-sampling layers, wherein each deconvolution layer is preceded by an up-sampling layer. FIG. 5 shows an architecture of the decoder unit 302b of the variational autoencoder 300, in accordance with some embodiments of the present disclosure. As shown in FIG. 5, the decoder unit 302b includes a fully connected layer (FCL), a reshaping layer (RSL), a first up-sampling layer (USL 1), a first deconvolution layer (DCL 1), a second up-sampling layer (USL 2), a second deconvolution layer (DCL 2), a third up-sampling layer (USL 3), a third deconvolution layer (DCL 3), a fourth up-sampling layer (USL 4), and a fourth deconvolution layer (DCL 4). The size of the fully connected layer (FCL) is 16348 neurons. The first up-sampling layer (USL 1) includes 256 channels, the first deconvolution layer (DCL 1) includes 128 channels, the second up-sampling layer (USL 2) includes 128 channels, the second deconvolution layer (DCL 2) includes 64 channels, the third up-sampling layer (USL 3) includes 64 channels, the third deconvolution layer (DCL 3) includes 32 channels, the fourth up-sampling layer (USL 4) includes 32 channels, and the fourth deconvolution layer (DCL 4) includes 3 channels.

The training process of the variational autoencoder 302 with the plurality of train cropped microstructure images obtained at step 206 of the method 200, to generate the trained variational autoencoder is explained in below steps. At step 208a of the method 200, a mini batch is formed using one or more train cropped microstructure images out of the plurality of train cropped microstructure images, based on a predefined mini batch size, to obtain one or more mini batches from the plurality of train cropped microstructure images. The predefined mini batch size defines the number of the train cropped microstructure images to be present in each mini batch. If the predefined mini batch size is 128, then each mini batch includes 128 train cropped microstructure images. Each mini batch includes unique train cropped microstructure images i.e., each train cropped microstructure image is present in only one mini batch.

At step 208b of the method 200, the one or more train cropped microstructure images present in each mini batch, at a time, out of the one or more mini batches, are passed to the variational autoencoder 302 for the training. At step 208c of the method 200, the steps 208c1 through 208c4 are performed, for the one or more train cropped microstructure images present in each mini batch, at a time, until the one or more mini batches are completed, to generate the trained variational autoencoder.

At step 208c1 of the method 200, a latent vector of each train cropped microstructure image of the one or more train cropped microstructure images present in the mini batch, is determined, using the encoder unit 302a of the variational autoencoder 302. The latent vector comprises a latent representation of the corresponding train cropped microstructure image, with a predefined dimension. In an embodiment, the predefined dimension of the latent vector is 64×1. If the image size (the predefined image size) of the train cropped microstructure image is 3×128×128 (here, 128×128 represents the resolution, and 3 represents color space), then the train cropped microstructure image processed across the layers present in the encoder unit 302a, to get the latent vector with the reduced predefined dimension of 64×1. More particularly, the output dimension of the first CNN block (CB 1) is 64×64×64, the output dimension of the second CNN block (CB 2) is 128×32×32, the output dimension of the third CNN block (CB 3) is 256×16×16, the output dimension of the fourth CNN block (CB 4) is 512×8×8, the output dimension of the fifth CNN block (CB 5) is 512×4×4, and finally the output dimension of the latent vector is 64×1.

The encoder unit 302a transforms feature space (spectrographic features) of the train cropped microstructure image into a gaussian probability distribution and allows random sampling from the gaussian probability distribution to generate the latent vector in the latent space. The first fully connected layer (FCL 1) is defined with the mean vector ($\mu$), and the second fully connected layer (FCL 2) is defined the variance vector ($\sigma$). In an embodiment, during at initialization stage of the encoder unit 302a, the mean vector ($\mu$) is zero and the variance vector ($\sigma$) is a unit variance vector (1). Later, the mean vector ($\mu$) and the variance vector ($\sigma$) are calculated based on number of input neurons and output neurons present in each layer of the encoder unit 302a. The output dimension of the FCL 1 (the mean vector) is 64×1 and the output dimension of the FCL 2 (the variance vector) is also 64×1. Hence the output dimension of the latent vector becomes 64×1.

At step 208c2 of the method 200, the latent vector of each train cropped microstructure image of the one or more train cropped microstructure images present in each mini batch of the one or more mini batches, is passed to the decoder unit 302b of the variational autoencoder 302, to get a reconstructed cropped microstructure image of the corresponding train cropped microstructure image. The decoder unit 302b transforms the latent space of the latent vector to the original feature space to get the reconstructed cropped microstructure image of the corresponding train cropped microstructure image. More specifically, the layers of the decoder unit 302b try to re-constructs the original feature space having the original dimensions from the latent space. The original feature space re-constructed by the decoder unit 302b is same as that of the feature space of the train cropped microstructure image.

As the predefined dimension of the latent vector is 64×1, which is fed to the decoder unit 302b, to re-constructs the original feature space of the train cropped microstructure image with the predefined image size of 3×128×128, the output dimensions of the layers present in the decoder unit 302b are accordingly defined. The output dimension of the fully connected layer (FCL) is 256×8×8 (resized), the output dimension of the first up-sampling layer (USL 1) is 256×16×16, the output dimension of the first deconvolution layer (DCL 1) is 128×16×16, the output dimension of the second up-sampling layer (USL 2) is 128×32×32, the output dimension of the second deconvolution layer (DCL 2) is 64×32×32, the output dimension of the third up-sampling layer (USL 3) is 64×64×64, the output dimension of the third deconvolution layer (DCL 3) is 32×64×64, the output dimension of the fourth up-sampling layer (USL 4) is 32×128×128, and finally the output dimension of the fourth deconvolution layer (DCL 4) is 3×128×128.

Conventional techniques that make use of variational auto encoders typically use a reconstruction loss as one of the loss function component, to reconstruct the original image. However, the reconstruction loss may not be suitable to model the mismatch between the microstructure image and the reconstruction. Because the reconstruction loss is equivalent to pixel-wise mean square error. But the pixel-wise comparison is not capable of capturing perceptual image similarity between the microstructures. This is because microstructures are of type texture images (they contain randomly repeated patterns such as spheres, lines, and so on). The present disclosure uses the style loss function to solve the mentioned challenges.

At step 208c3 of the method 200, a set of model weights of the variational autoencoder 302 is estimated, by minimizing a loss function of the variational autoencoder. In an embodiment, the loss function of the variational autoencoder includes a style loss function and a Kullback-Leibler (KL) loss function. The style loss function determines a style loss between each train cropped microstructure image present in each mini batch of the one or more mini batches and the corresponding reconstructed cropped microstructure image. Let the train cropped microstructure image be x and the corresponding reconstructed cropped microstructure image be x', then, the style loss function is defined in equation 1:

$$\text{Style loss function} = L_{style}(G(x), G(x')) = \sum_{l=0}^{L} W_l \left[ \frac{1}{4C_l^2 M_l^2} \sum_{i,j} (G_{ij}^l - ((G_{ij}^{\prime l}))^2 \right] \quad (1)$$

where G(x) is gram matrices of the train cropped microstructure image x, and G(x') is gram matrices of corresponding reconstructed cropped microstructure image x'.

Figure 6:
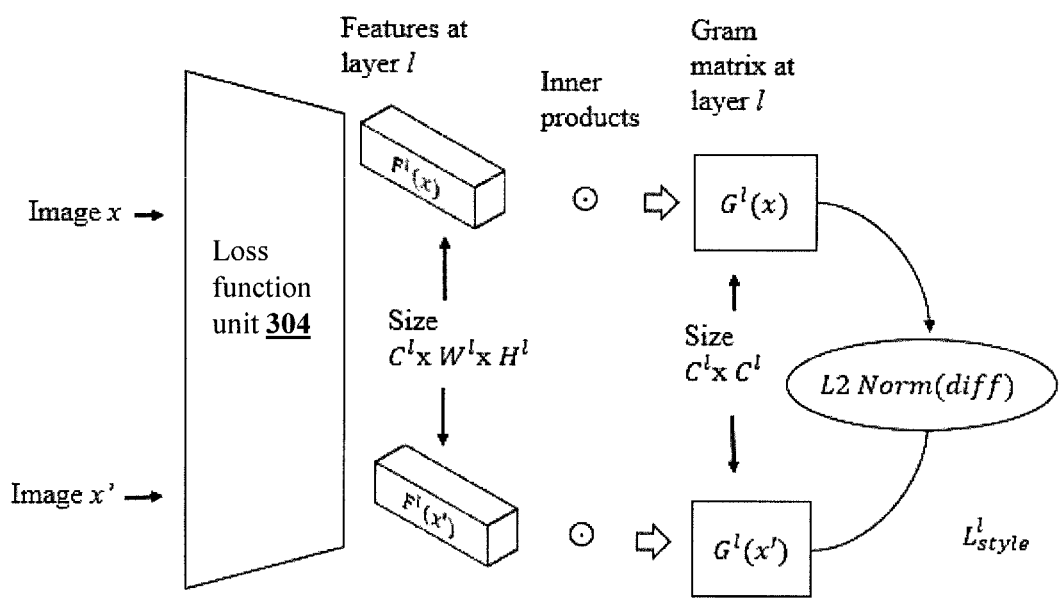
FIG. 6 is a flow diagram for calculating a style loss between a microstructure image and a reconstructed microstructure image, using a loss function unit, in accordance with some embodiments of the present disclosure.

FIG. 6 is a flow diagram for calculating a style loss between the train cropped microstructure image and the corresponding reconstructed cropped microstructure image, using the loss function unit, in accordance with some embodiments of the present disclosure. As shown in FIG. 6, the train cropped microstructure image x and the corresponding reconstructed cropped microstructure image x' are passed separately, to the loss function network 304a present in the loss function unit 304, to obtain features $F^l(x)$ of the train cropped microstructure image x and features $F^l(x')$ of the corresponding reconstructed cropped microstructure image x', at each layer l of the loss function network 304a. In an embodiment, the loss function network 304a may be the VGG-19 CNN Then, an inner product is performed between the obtained features $F^l(x)$ of the train cropped microstructure image x, at each layer l of the loss function network 304a, to obtain the gram matrix $G^l(x)$ of the train cropped microstructure image x, at the respective layer l. Similarly, the inner product is performed between the obtained features $F^l(x')$ of the corresponding reconstructed cropped microstructure image x', at each layer l of the loss function network 304a, to obtain the gram matrix $G^l(x')$ of the of the corresponding reconstructed cropped microstructure image x', at the respective layer l. Then, the style loss between the train cropped microstructure image x and the corresponding reconstructed cropped microstructure image x', at the layer l is calculated by taking L2 Norm (difference) between the corresponding gram matrix $G^l(x)$ and the corresponding gram matrix $G^l(x')$.

The KL loss function determines a KL divergence between posterior distribution of the latent vector of each train cropped microstructure image present in each mini batch of the one or more mini batches and a predefined prior distribution. The KL loss function is defined in equation 2:

$$\text{KL loss function} = D_{KL}[q_\emptyset(z|x)\|p_\theta(z)] \quad (2)$$

where z is the latent vector of the train cropped microstructure image x, $q_\emptyset(z|x)$ is the posterior distribution of the latent vector z of the train cropped microstructure image x, corresponding reconstructed cropped microstructure image x', $p_\theta(z)$ is the predefined prior distribution of the latent vector z of the train cropped microstructure image x. The predefined prior distribution is N(0,I) where the predefined mean vector (μ) is 0 (zero), the predefined variance vector (σ) is a unit variance vector (I), and N denotes normal distribution.

Hence, the loss function of the variational autoencoder for each pair of the train cropped microstructure image x and the corresponding reconstructed cropped microstructure image x', is defined in equation 3:

$$\text{Loss function} = L_{style}(G(x),G(x')) + D_{KL}[q_\emptyset(z|x)\|p_\theta(z)] \quad (3)$$

The loss function of the variational autoencoder for each pair of the train cropped microstructure image x and the corresponding reconstructed cropped microstructure image x', present in one mini batch is determined. The set of model weights of the variational autoencoder are estimated based on the pair of the train cropped microstructure image x and the corresponding reconstructed cropped microstructure image x', whose loss function value is minimum, for the current mini batch.

At step 208c4 of the method 200, the variational autoencoder are updated with the set of model weights estimated at step 208c3 of the method 200, for the current mini batch. The variational autoencoder with the updated set of model weights is then used for the successive mini batch. Similarly, the estimated set of model weights of the variational autoencoder are updated in each subsequent mini batch, until the one or more mini batches are completed to get the trained variational autoencoder. The trained variational autoencoder resulted in the step 208c4 of the method 200 is used to generate the reconstructed image for any input image.

At step 210 of the method 200, the one or more hardware processors 104 of the system 100 are configured to interpret the trained variational autoencoder obtained at step 208 of the method, with each cropped microstructure image of the plurality of cropped microstructure images of the material obtained at step 204 of the method 200, to obtain a plurality of predefined features for the corresponding cropped microstructure image. The interpretation of the trained variational autoencoder is performed to investigate the hidden features of the material present in the corresponding cropped microstructure image. Each portion of the microstructure image may exhibit different feature of the corresponding material. Each hidden feature of the material is investigated by varying the associated part present in the corresponding reconstructed image and by fixing other features.

The plurality of predefined features are morphological features that are hidden in the given material. The plurality of predefined features may be different for each material based on the material type. For example, the material cast iron mainly contains two phases—(i) ferrite and (ii) graphite. Depending upon how the form or appearance of the graphite, different types of cast irons are defined. Within each type, different set of features are defined. The form of the graphite also becomes a feature itself.

1. Flakes cast iron (also known as gray cast iron): The graphite appears in the form of flakes—like black lines growing in random directions. Following are some of the key morphological features of the flakes cast iron:
    Fineness of flakes: Measured by the thickness of the black lines in microns.
    Distribution of flakes: Interdendritic vs non-interdendritic, i.e. do the flakes grow from a set of common centers, or they are independent?
    Orientation of flakes: Angle to the horizontal plane at which the lines are oriented
2. Nodules or spherical cast iron: The graphite appears in the form of spheres or nodules. Following are some of the key morphological features of the spherical cast iron
    Nodule size: average diameter of the nodules.
    Shape perfection: Circularity (measured by the ratio of the length of major axis to minor axis—a ratio of 1 means perfectly circular).
    Density: Number of nodules per unit area.

Hence some of the plurality of predefined features for the cast iron includes (i) small dense spheres, (ii) small sparse spheres, (iii) large spheres, (iv) intermediate with small spheres, (v) intermediate with large spheres, (vi) fine flakes, (vii) sparse, medium thick flakes, (viii) thick flakes, and so on.

The interpretation of the trained variational autoencoder with each cropped microstructure image to assign the plurality of predefined features for the corresponding cropped microstructure image is further explained in below steps. At step 210a of the method 200, the latent vector for the cropped microstructure image is determined, using the encoder unit of the trained variational autoencoder. The latent vector comprises the latent representation of the corresponding cropped microstructure image, with the predefined dimension. At step 210b of the method 200, a plurality of variation latent vectors for the cropped microstructure image are obtained. A set of variation latent vectors is obtained by varying each dimension of the corresponding latent vector in a predefined range, to form the plurality of variation latent vectors from all the dimensions of the corresponding latent vector. In this case as the predefined dimension of the latent vector is 64×1, which mean 64 dimensions, out of the 64 dimensions, each dimension is varied in the predefined range and the remaining dimensions are fixed to obtain the corresponding set of variation latent vectors. For example, the dimension 3 out of the 64 dimensions is varied in the predefined range and the remaining 63 dimensions are fixed to obtain the corresponding set of variation latent vectors, and so on. In an embodiment, the predefined range is (−3, 3). Hence, 64 sets of variation latent vectors are obtained to form the plurality of variation latent vectors for the cropped microstructure image.

At step 210c of the method 200, a reconstructed variation microstructure image for each variation latent vector is generated, to obtain a plurality of reconstructed variation microstructure images from the plurality of variation latent vectors, for the cropped microstructure image, using the decoder unit of the trained variational autoencoder. In this case, for the 64 sets of variation latent vectors, 64 sets of reconstructed variation microstructure images are obtained for the cropped microstructure image.

At step 210d of the method 200, each dimension associated with the latent vector for the cropped microstructure image is assigned, with a predefined feature of the plurality of predefined features, based on structural analysis of the corresponding reconstructed variation microstructure image. The mapping between (i) each dimension (ii) each variation latent vector, and (iii) each predefined feature, is performed in this interpretation step, for each cropped microstructure image of the plurality of cropped microstructure images. This helps in identifying hidden features of the material during the investigation. Note here that some of the dimensions associated with the latent vector for the cropped microstructure image are not assigned with any feature as they may be irrelevant and does not exhibit any feature.

At step 212 of the method 200, the one or more hardware processors 104 of the system 100 are configured to receive (i) a test microstructure image of the material, whose synthetic microstructure images with the desired feature to be generated, and (ii) the desired feature. The test microstructure image of the material is of a predefined test image size. The predefined test image size is the resolution of the test microstructure image of the material. The desired feature is one among the plurality of predefined features that are classified during the interpretation of the trained variational autoencoder.

The test microstructure image of the material may already include one feature out of the plurality of predefined features. The desired feature is one among the plurality of predefined features but is different to the already present feature. For example, if the test microstructure image has the feature 'large spheres', and the desired feature is 'small sparse spheres', then the 'large spheres' present in the test microstructure image to be replaced with the 'small sparse spheres', to generate the synthesized microstructure images for the test microstructure image.

At step 214 of the method 200, the one or more hardware processors 104 of the system 100 are configured to generate the synthetic microstructure images with the desired feature, for the test microstructure image of the material received at step 212 of the method, based on the desired feature, using the trained variational autoencoder and the interpretation performed at the step 210 of the method 200. The generation of the synthetic microstructure images with the desired feature, for the test microstructure image is further explained in below steps.

At step 214a of the method 200, the test microstructure image of the material, is resized, based on the predefined test image size, to obtain a resized test microstructure image of the material. The resized test microstructure image of the material is of a predefined transformed image size. More specifically, the predefined test image size of the test microstructure image is resized to the predefined transformed image size. The predefined transformed image size is same as that of the predefined cropped image size mentioned at step 204 of the method 200.

At step 214b of the method 200, a test latent vector of the resized test microstructure image of the material, is determined using the encoder unit of the trained variational autoencoder. The test latent vector of the resized test microstructure image of the material comprises the latent representation of the resized test microstructure image, with the predefined dimension. At step 214c of the method 200, an associated dimension for the resized test microstructure image of the material, based on the desired feature, is identified, from classification performed during the interpretation of the trained variational autoencoder at step 212 of the method 200. More specifically, out of the 64 dimensions, the dimension mapped to the desired feature during the interpretation step is identified.

At step 214d of the method 200, a variation test latent vector of the resized test microstructure image of the material is obtained, by varying the identified dimension at the step 214c of the method 200, in the test latent vector of the resized test microstructure image of the material, obtained at step 214b of the method 200, in the predefined range used during the interpretation step. Finally, at step 214e of the method 200, one or more synthetic microstructure images with the desired feature, are generated by passing the variation test latent vector of the resized test microstructure image of the material obtained at step 214d of the method 200, through the decoder unit of the trained variational autoencoder. If the desired feature is associated with one variation, then only one synthetic microstructure image is generated, else multiple synthetic microstructure images are generated.

Further, at step 216 of the method 200, the one or more hardware processors 104 of the system 100 are configured to validate the trained variational autoencoder obtained at step 208 of the method 200, using the plurality of validation cropped microstructure images obtained at step 206 of the method 200. The validation of the trained variational autoencoder is performed to check an accuracy of the trained variational autoencoder. The validation of the trained variational autoencoder with the plurality of validation cropped microstructure images is explained in detail in the following steps.

At step 216a of the method 200, a reconstructed validation microstructure image for each validation cropped microstructure image of the plurality of validation cropped microstructure images, is generated using the trained variational autoencoder. A plurality of the reconstructed validation microstructure images is obtained from the plurality of validation cropped microstructure images. At step 216b of the method 200, a texture similarity score for each validation cropped microstructure image of the plurality of validation cropped microstructure images, is determined. The texture similarity score for each validation cropped microstructure image is determined based on a texture similarity between the reconstructed validation microstructure image and the corresponding validation cropped microstructure image. In an embodiment, texture similarity score is determined by using one of texture similarity metrics (i) deep image structure and texture similarity (DISTS) metric, and (ii) Structural texture similarity (STSIM) metric.

The DISTS metric consists of two terms—first one compares the means of features maps of the reconstructed validation microstructure image and the corresponding validation cropped microstructure image, and the second one computes cross covariance between the reconstructed validation microstructure image and the corresponding validation cropped microstructure image. The STSIM metric is based on a similar modification of structural similarity metric (SSIM) to completely avoid pixel-by-pixel comparison but is computed in the Fourier spectrum.

At step 216c of the method 200, an average texture similarity score for the plurality of validation cropped microstructure images, is determined by taking average of the texture similarity scores of the plurality of validation cropped microstructure images obtained at step 216b of the method 200, to validate the trained variational autoencoder. If the average texture similarity score is greater than or equal to a predefined threshold, then the trained variational autoencoder obtained at step 208 of the method 200 is efficient and accurate for the testing. If the average texture similarity score is less than the predefined threshold, then the trained variational autoencoder obtained at step 208 of the method 200 may be retrained as mentioned at step 208 of the method until the average texture similarity score is greater than or equal to the predefined threshold. In an embodiment, the predefined threshold is 0.6.

In embodiment, the validation of the trained variational autoencoder is performed before the interpretation mentioned at step 210 of the method 200 and before generating the synthetic microstructure images with the desired feature mentioned at step 214 of the method 200. Hence the trained variational autoencoder is efficient and accurate enough to generate the synthetic microstructure images with the desired feature.

In accordance with the present disclosure, the methods and systems, effectively generate the synthetic microstructure images with the desired features, with the use of the trained variational autoencoder with the interpretation. The style loss function defined in the loss function enables the trained variational autoencoder to generate the synthetic microstructure images more accurately. The generated synthetic microstructure images with the desired features are very helpful in determining complex mapping between (i) the manufacturing process with the defined process parameters and (ii) the target properties and the structure of the material. The generated synthetic microstructure images are statistically equivalent to the actual microstructure images; hence the methods and systems of the present disclosure is efficient and effective in investigating the microstructure images for numerous applications in the material science and engineering.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims (when included in the specification), the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for generating synthetic microstructure images of a material with a desired feature, the method comprising the steps of:
receiving, via one or more hardware processors, a plurality of microstructure images of the material, wherein each microstructure image of the plurality of microstructure images is of a predefined image size;
dividing, via the one or more hardware processors, each microstructure image of the plurality of microstructure images of the material, into one or more cropped microstructure images, based on the predefined image size of the corresponding microstructure image, to obtain a plurality of cropped microstructure images from the plurality of microstructure images of the material, wherein each cropped microstructure image of the plurality of cropped microstructure images is of a predefined cropped image size;
splitting, via the one or more hardware processors, the plurality of cropped microstructure images of the material, into a plurality of train cropped microstructure images and a plurality of validation cropped microstructure images, based on a predefined ratio;
generating, via the one or more hardware processors, a trained variational autoencoder, by training a variational autoencoder with the plurality of train cropped microstructure images, wherein the trained variational autoencoder is generated by:
forming a mini batch using one or more train cropped microstructure images out of the plurality of train cropped microstructure images, based on a predefined mini batch size, to obtain one or more mini batches from the plurality of train cropped microstructure images;
passing the one or more train cropped microstructure images present in each mini batch, at a time, out of the one or more mini batches, to the variational autoencoder for the training; and
performing, for the one or more train cropped microstructure images present in each mini batch, at a time, until the one or more mini batches are completed, to generate the trained variational autoencoder, the steps of:
determining a latent vector of each train cropped microstructure image of the one or more train cropped microstructure images present in the mini batch, using an encoder unit of the variational autoencoder, wherein the latent vector comprises a latent representation of the corresponding train cropped microstructure image, with a predefined dimension;
passing the latent vector of each train cropped microstructure image of the one or more train cropped microstructure images present in the mini batch, to a decoder unit of the variational autoencoder, to get a reconstructed cropped microstructure image of the corresponding train cropped microstructure image;
estimating a set of model weights of the variational autoencoder, by minimizing a loss function of the variational autoencoder; and
updating the variational autoencoder with the set of model weights;
interpreting, via the one or more hardware processors, the trained variational autoencoder, with each cropped microstructure image of the plurality of cropped microstructure images of the material, to assign a plurality of predefined features for the corresponding cropped microstructure image;
receiving, via the one or more hardware processors, (i) a test microstructure image of the material, whose synthetic microstructure images with the desired feature to be generated, and (ii) the desired feature, wherein the test microstructure image of the material is of a predefined test image size; and
generating, via the one or more hardware processors, the synthetic microstructure images with the desired feature, for the test microstructure image of the material, based on the desired feature, using the trained variational autoencoder.

2. The method of claim 1, further comprising validating, via the one or more hardware processors, the trained variational autoencoder, using the plurality of validation cropped microstructure images, wherein the validation comprises:
generating a reconstructed validation microstructure image for each validation cropped microstructure image of the plurality of validation cropped microstructure images, using the trained variational autoencoder;
determining a texture similarity score for each validation cropped microstructure image of the plurality of validation cropped microstructure images, wherein the texture similarity score for each validation cropped microstructure image defines a texture similarity between the reconstructed validation microstructure image and the corresponding validation cropped microstructure image; and
determining an average texture similarity score for the plurality of validation cropped microstructure images, based on the texture similarity score for each validation cropped microstructure image of the plurality of validation cropped microstructure images, to validate the trained variational autoencoder.

3. The method of claim 1, wherein interpreting the trained variational autoencoder, with each cropped microstructure image of the plurality of cropped microstructure images, to assign the plurality of predefined features for the corresponding cropped microstructure image, further comprising:
determining the latent vector for each cropped microstructure image of the plurality of cropped microstructure images, using the encoder unit of the trained variational autoencoder, wherein the latent vector comprises the latent representation of the corresponding cropped microstructure image, with the predefined dimension;
obtaining a plurality of variation latent vectors for each cropped microstructure image, wherein the plurality of variation latent vectors is obtained by varying each dimension of the corresponding latent vector in a predefined range;
generating a reconstructed variation microstructure image for each variation latent vector to obtain a plurality of reconstructed variation microstructure images from the plurality of variation latent vectors, for each cropped microstructure image, using the decoder unit of the trained variational autoencoder; and
assigning each dimension associated with the latent vector for each cropped microstructure image, with a predefined feature of the plurality of predefined features, based on structural analysis of the corresponding reconstructed variation microstructure image.

4. The method of claim 1, wherein generating the synthetic microstructure images with the desired feature, for the test microstructure image of the material, based on the desired feature, using the trained variational autoencoder, further comprising:
resizing the test microstructure image of the material, based on the predefined test image size, to obtain a resized test microstructure image of the material, wherein the resized test microstructure image of the material is of a predefined transformed image size;
determining a test latent vector of the resized test microstructure image of the material, using the encoder unit of the trained variational autoencoder, wherein the test latent vector of the resized test microstructure image of the material comprises the latent representation of the resized test microstructure image, with the predefined dimension;
identifying a dimension for the resized test microstructure image of the material, based on the desired feature, from classification performed during the interpretation of the trained variational autoencoder;
obtaining a variation test latent vector of the resized test microstructure image of the material, by varying the identified dimension in the test latent vector of the resized test microstructure image of the material, in a predefined range; and
generating the synthetic microstructure images with the desired feature, by passing the variation test latent vector of the resized test microstructure image of the material, through the decoder unit of the trained variational autoencoder.

5. The method of claim 1, wherein the loss function of the variational autoencoder comprises a style loss function and a Kullback-Leibler (KL) loss function, wherein the style loss function determines a style loss between each train cropped microstructure image present in each mini batch of the one or more mini batches and the corresponding reconstructed cropped microstructure image, and (ii) the KL loss function determines a KL divergence between posterior distribution of the latent vector of each train cropped microstructure image present in each mini batch of the one or more mini batches and a predefined prior distribution.

6. The method of claim 1, wherein the encoder unit of the variational autoencoder comprises five convolutional neural network (CNN) blocks, four max-pooling layers, and two parallel fully connected network (FCN) layers, wherein each CNN block is followed by a max-pooling layer except the last CNN block.

7. The method of claim 1, wherein the decoder unit of the variational autoencoder comprises a fully connected layer, four deconvolution layers, and four up-sampling layers, wherein each deconvolution layer is preceded by an up-sampling layer.

8. The method of in claim 1, wherein the plurality of predefined features defines morphological features of the material.

9. A system for generating synthetic microstructure images of a material with a desired feature, the system comprising:
a memory storing instructions;
one or more Input/Output (I/O) interfaces; and
one or more hardware processors coupled to the memory via the one or more I/O interfaces, wherein the one or more hardware processors are configured by the instructions to:
receive a plurality of microstructure images of the material, wherein each microstructure image of the plurality of microstructure images is of a predefined image size;
divide each microstructure image of the plurality of microstructure images of the material, into one or more cropped microstructure images, based on the predefined image size of the corresponding microstructure image, to obtain a plurality of cropped microstructure images from the plurality of microstructure images of the material, wherein each cropped microstructure image of the plurality of cropped microstructure images is of a predefined cropped image size;
split the plurality of cropped microstructure images of the material, into a plurality of train cropped microstructure images and a plurality of validation cropped microstructure images, based on a predefined ratio;
generate a trained variational autoencoder, by training a variational autoencoder with the plurality of train cropped microstructure images, wherein the trained variational autoencoder is generated by:
forming a mini batch using one or more train cropped microstructure images out of the plurality of train cropped microstructure images, based on a predefined mini batch size, to obtain one or more mini batches from the plurality of train cropped microstructure images;
passing the one or more train cropped microstructure images present in each mini batch, at a time, out of the one or more mini batches, to the variational autoencoder for the training; and
performing, for the one or more train cropped microstructure images present in each mini batch, at a time, until the one or more mini batches are completed, to generate the trained variational autoencoder, the steps of:
determining a latent vector of each train cropped microstructure image of the one or more train cropped microstructure images present in the mini batch, using an encoder unit of the variational autoencoder, wherein the latent vector comprises a latent representation of the corresponding train cropped microstructure image, with a predefined dimension;
passing the latent vector of each train cropped microstructure image of the one or more train cropped microstructure images present in the mini batch, to a decoder unit of the variational autoencoder, to get a reconstructed cropped microstructure image of the corresponding train cropped microstructure image;
estimating a set of model weights of the variational autoencoder, by minimizing a loss function of the variational autoencoder; and
updating the variational autoencoder with the set of model weights;
interpret the trained variational autoencoder, with each cropped microstructure image of the plurality of cropped microstructure images of the material, to assign a plurality of predefined features for the corresponding cropped microstructure image;
receive (i) a test microstructure image of the material, whose synthetic microstructure images with the desired feature to be generated, and (ii) the desired feature, wherein the test microstructure image of the material is of a predefined test image size; and
generate the synthetic microstructure images with the desired feature, for the test microstructure image of the material, based on the desired feature, using the trained variational autoencoder.

10. The system of claim 9, wherein the one or more hardware processors are further configured to validate the trained variational autoencoder, using the plurality of validation cropped microstructure images, by:
generating a reconstructed validation microstructure image for each validation cropped microstructure image of the plurality of validation cropped microstructure images, using the trained variational autoencoder;
determining a texture similarity score for each validation cropped microstructure image of the plurality of validation cropped microstructure images, wherein the texture similarity score for each validation cropped microstructure image defines a texture similarity between the reconstructed validation microstructure image and the corresponding validation cropped microstructure image; and
determining an average texture similarity score for the plurality of validation cropped microstructure images, based on the texture similarity score for each validation cropped microstructure image of the plurality of validation cropped microstructure images, to validate the trained variational autoencoder.

11. The system of claim 9, the one or more hardware processors are further configured to interpret the trained variational autoencoder, with each cropped microstructure image of the plurality of cropped microstructure images, to assign the plurality of predefined features for the corresponding cropped microstructure image, by:
determining the latent vector for each cropped microstructure image of the plurality of cropped microstructure images, using the encoder unit of the trained variational autoencoder, wherein the latent vector comprises the latent representation of the corresponding cropped microstructure image, with the predefined dimension;
obtaining a plurality of variation latent vectors for each cropped microstructure image, wherein the plurality of variation latent vectors is obtained by varying each dimension of the corresponding latent vector in a predefined range;
generating a reconstructed variation microstructure image for each variation latent vector to obtain a plurality of reconstructed variation microstructure images from the plurality of variation latent vectors, for each cropped microstructure image, using the decoder unit of the trained variational autoencoder; and
assigning each dimension associated with the latent vector for each cropped microstructure image, with a predefined feature of the plurality of predefined features, based on structural analysis of the corresponding reconstructed variation microstructure image.

12. The system of claim 9, wherein the one or more hardware processors are further configured to generate the synthetic microstructure images with the desired feature, for the test microstructure image of the material, based on the desired feature, using the trained variational autoencoder, by:
resizing the test microstructure image of the material, based on the predefined test image size, to obtain a resized test microstructure image of the material, wherein the resized test microstructure image of the material is of a predefined transformed image size;
determining a test latent vector of the resized test microstructure image of the material, using the encoder unit of the trained variational autoencoder, wherein the test latent vector of the resized test microstructure image of the material comprises the latent representation of the resized test microstructure image, with the predefined dimension;
identifying a dimension for the resized test microstructure image of the material, based on the desired feature, from classification performed during the interpretation of the trained variational autoencoder;
obtaining a variation test latent vector of the resized test microstructure image of the material, by varying the identified dimension in the test latent vector of the resized test microstructure image of the material, in a predefined range; and
generating the synthetic microstructure images with the desired feature, by passing the variation test latent vector of the resized test microstructure image of the material, through the decoder unit of the trained variational autoencoder.

13. The system of claim 9, wherein the loss function of the variational autoencoder comprises a style loss function and a Kullback-Leibler (KL) loss function, wherein the style loss function determines a style loss between each train cropped microstructure image present in each mini batch of the one or more mini batches and the corresponding reconstructed cropped microstructure image, and (ii) the KL loss function determines a KL divergence between posterior distribution of the latent vector of each train cropped microstructure image present in each mini batch of the one or more mini batches and a predefined prior distribution.

14. The system of claim 9, wherein the encoder unit of the variational autoencoder comprises five convolutional neural network (CNN) blocks, four max-pooling layers, and two parallel fully connected network (FCN) layers, wherein each CNN block is followed by a max-pooling layer except the last CNN block.

15. The system of claim 9, wherein the decoder unit of the variational autoencoder comprises a fully connected layer, four deconvolution layers, and four up-sampling layers, wherein each deconvolution layer is preceded by an up-sampling layer.

16. The system of claim 9, wherein the plurality of predefined features defines morphological features of the material.

17. A computer program product comprising a non-transitory computer readable medium having a computer readable program embodied therein, wherein the computer readable program, when executed on a computing device, causes the computing device to:
receive a plurality of microstructure images of the material, wherein each microstructure image of the plurality of microstructure images is of a predefined image size;
divide each microstructure image of the plurality of microstructure images of the material, into one or more cropped microstructure images, based on the predefined image size of the corresponding microstructure image, to obtain a plurality of cropped microstructure images from the plurality of microstructure images of the material, wherein each cropped microstructure image of the plurality of cropped microstructure images is of a predefined cropped image size;
split the plurality of cropped microstructure images of the material, into a plurality of train cropped microstructure images and a plurality of validation cropped microstructure images, based on a predefined ratio;
generate a trained variational autoencoder, by training a variational autoencoder with the plurality of train cropped microstructure images, wherein the trained variational autoencoder is generated by:

forming a mini batch using one or more train cropped microstructure images out of the plurality of train cropped microstructure images, based on a predefined mini batch size, to obtain one or more mini batches from the plurality of train cropped microstructure images;

passing the one or more train cropped microstructure images present in each mini batch, at a time, out of the one or more mini batches, to the variational autoencoder for the training; and performing, for the one or more train cropped microstructure images present in each mini batch, at a time, until the one or more mini batches are completed, to generate the trained variational autoencoder, the steps of:

determining a latent vector of each train cropped microstructure image of the one or more train cropped microstructure images present in the mini batch, using an encoder unit of the variational autoencoder, wherein the latent vector comprises a latent representation of the corresponding train cropped microstructure image, with a predefined dimension;

passing the latent vector of each train cropped microstructure image of the one or more train cropped microstructure images present in the mini batch, to a decoder unit of the variational autoencoder, to get a reconstructed cropped microstructure image of the corresponding train cropped microstructure image;

estimating a set of model weights of the variational autoencoder, by minimizing a loss function of the variational autoencoder; and updating the variational autoencoder with the set of model weights;

interpret the trained variational autoencoder, with each cropped microstructure image of the plurality of cropped microstructure images of the material, to assign a plurality of predefined features for the corresponding cropped microstructure image;

receive (i) a test microstructure image of the material, whose synthetic microstructure images with the desired feature to be generated, and (ii) the desired feature, wherein the test microstructure image of the material is of a predefined test image size; and generate the synthetic microstructure images with the desired feature, for the test microstructure image of the material, based on the desired feature, using the trained variational autoencoder.

* * * * *